United States Patent [19]

Ballinger

[11] 4,012,697
[45] Mar. 15, 1977

[54] CLOCK SIGNAL EXTRACTION DURING PLAYBACK OF A SELF-CLOCKING DIGITAL RECORDING

[75] Inventor: Dale O. Ballinger, Denver, Colo.

[73] Assignee: Honeywell Inc., Minneapolis, Minn.

[22] Filed: June 30, 1975

[21] Appl. No.: 591,342

[52] U.S. Cl. .............................. 328/63; 178/69.1; 307/208; 307/269; 328/72

[51] Int. Cl.² .................. H03K 1/17; H03K 17/00; H03K 5/13

[58] Field of Search ............. 307/208, 269; 328/63, 328/72; 178/69.5 R

[56] References Cited

UNITED STATES PATENTS

| | | | |
|---|---|---|---|
| 3,602,828 | 8/1971 | Kurzweil, Jr. et al | 328/63 |
| 3,609,560 | 9/1971 | Greenberg | 328/63 |
| 3,663,883 | 5/1972 | Olso | 328/63 |
| 3,894,246 | 7/1975 | Torgrim | 328/63 |

Primary Examiner—Stanley D. Miller, Jr.
Attorney, Agent, or Firm—Laurence J. Marhoefer; Lockwood D. Burton; Mitchell J. Halista

[57] ABSTRACT

A clock signal extraction circuit for extracting a clock signal from a reproduced self-clocking digital recording while masking unwanted data transitions from the extracted clock signal. A plurality of input single-shots are selectively operated to produce control signals having respective durations for controlling the gating of a reproduced self-clocking input signal. The gating of the input signal allows only the clock signal transitions in the input signal to be applied to a clock signal output. The single-shots are selected by a comparator circuit which sequentially compares the time of occurrence of the extracted clock signal to each of a plurality of nominal occurrence times equal in number to the number of input single-shots to be controlled thereby.

10 Claims, 5 Drawing Figures

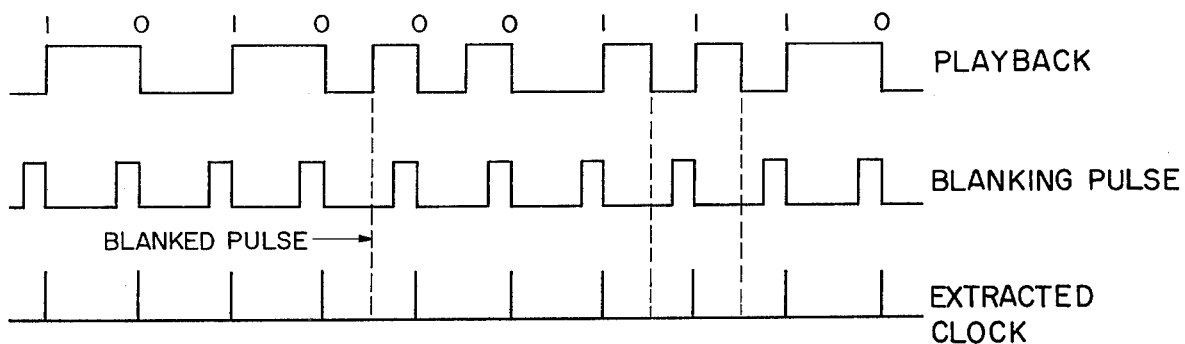
FIG. 2
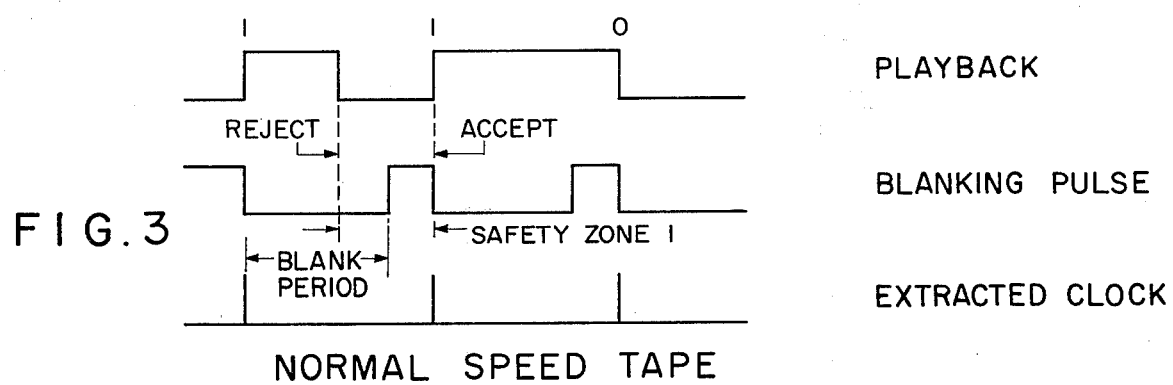
FIG. 3  NORMAL SPEED TAPE
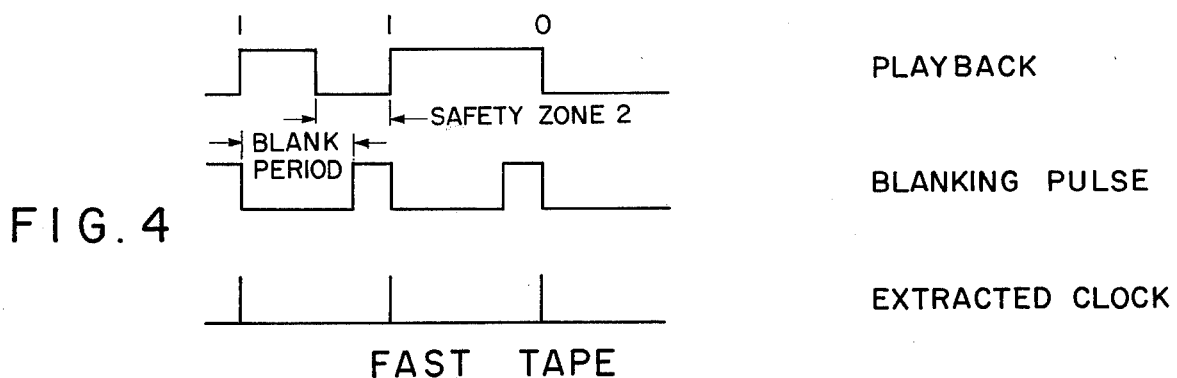
FIG. 4  FAST TAPE
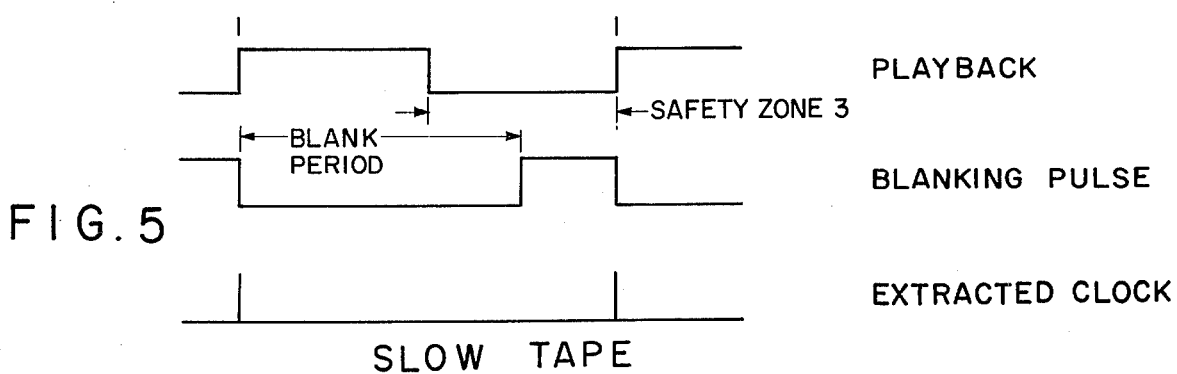
FIG. 5  SLOW TAPE

CLOCK SIGNAL EXTRACTION DURING PLAYBACK OF A SELF-CLOCKING DIGITAL RECORDING

BACKGROUND OF THE INVENTION

1. Field of the Invention

This invention relates to data recording. More specifically, the present invention is directed to a self-clocking digital recording apparatus.

2. Description of the Prior Art

The conventional method of extracting a clock signal from a playback of a recorded self-clocking digital code, such as bi-phase and phase modulated, is to use a locally generated fixed time period pulse in a clock signal extracting circuit to overlap the unwanted reproduced data pulses. This technique blanks out the unwanted data pulses in the clock extraction circuit while supplying a fixed clock pulse from the reproduced coded signals. In conventional self-clocking codes, there is always a transition of the recorded level at a time when a clock pulse has been completed regardless of the information content of the data being concurrently recorded. Whether a transition also occurs between these regular "clocking transitions" depends upon the data, or information, recorded along with the clock signals. A negative going transition at the clock transition time generally denotes a binary 0 and a positive going transition generally denotes a binary 1. Thus, the recorded clock signal is present during play back in the clock extraction circuit along with the pulses which were recorded as a result of the information content. The blanking pulse is ordinarily located in an unblank position midway between the unwanted data pulse and the desired clock signal transition. The time between the termination, or return, of the blanking pulse and the adjacent reproduced data pulses is a safety zone. This safety zone would normally be sufficient to insure that the unwanted data pulses are disregarded by the clock extraction circuit were it not for so-called tape jitter. At the packing density in bits per inch of tape per track is increased, the tape jitter begins to consume a substantial portion of the safety zone by producing displaced data pulses until eventually errors in the extracted clock signal occur. If this happens before the maximum packing density defined by the magnetic limitations of head gap, tape properties and tape speed has been reached, the maximum storage efficiency of the type recording is unavailable. Accordingly, an alternative approach to clock recovery which minimizes the effect of tape jitter is desirable to eliminate errors in the extracted clock signal.

SUMMARY OF THE INVENTION

An object of the present invention is to provide an improved clock extraction circuit for clock signal recovery during playback of recorded self-clocking digital information.

In accomplishing this and other objects, there has been provided, in accordance with the present invention, a clock signal extraction circuit having an input signal gating means for controlling the gating of input signal transitions to a clock signal output while masking unwanted data transitions. The input signal gating means includes a plurality of single-shot multivibrators generating differing length output signals which are selectively energized to control a gate for passing the clock signal transitions. The multivibrators are selected by a comparator circuit which compares the time of occurrence of the reconstituted clock signal with nominal values of a plurality of occurrence times represented by time periods equal in number to the number of multivibrators. The occurrence of a clock signal within one of the time periods is effective to select a corresponding one of the multivibrators to control the gating of succeeding clock signals.

BRIEF DESCRIPTION OF THE DRAWINGS

A better understanding of the present invention may be had when the following detailed description is read in connection with the accompanying drawings in which:

FIGS. 2 to 5 are waveshape diagrams illustrating the operation of the circuit in FIG. 1.

DESCRIPTION OF THE PREFERRED EMBODIMENT

Detailed Description

Figure 1:
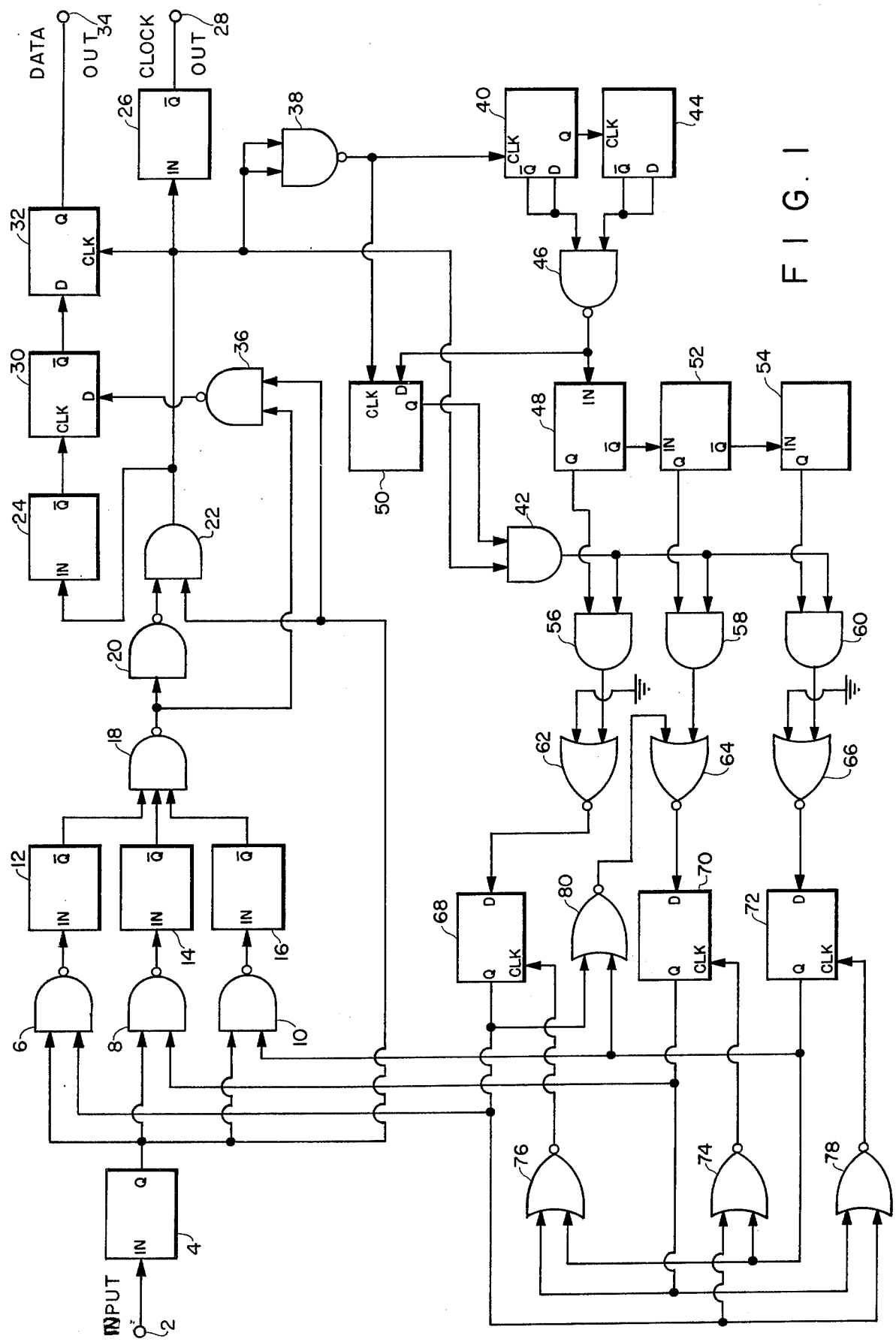
FIG. 1 is a block diagram schematic of a clock extraction circuit embodying the present invention.

Referring to FIG. 1 in more detail, there is shown a block diagram of a clock signal extraction circuit for extracting a clock signal from a self-clocking digital code recorded on a suitable recording medium, e.g., a magnetic tape. An input signal derived from the recorded self-clocking data is applied to an input terminal 2 which is connected to the input of a first single-shot, or monostable multivibrator, 4. An output signal from the first single-shot 4 is applied as a first input signal to each of three NAND gates 6, 8, and 10. The respective output signals from the three NAND gates 6, 8, and 10 are applied to the respective inputs of three so-called "zone" single-shots 12, 14, and 16. The output signals from each of the single-shots 12, 14, and 16 are summed by a fourth NAND gate 18. An output signal from the fourth NAND gate 18 is applied through a first logical inverter 20 as a first input signal for a first AND gate 22. An output signal from the first AND gate 22 is applied to a fifth single-shot 24 and to a sixth single-shot 26. The output of the sixth single-shot 26 is connected to a "clock out" output terminal 28. An output signal from the fifth single-shot 24 is applied to the clock input of a first D flip-flop 30 which has its $\overline{Q}$ output connected to the D input of a second D flip-flop 32. The Q output of the second D flip-flop 32 is connected to a "data out" output terminal 34. The D input of the first D flip-flop 30 is connected to the output of a fifth NAND gate 36. The input signals for the fifth NAND gate 36 are obtained from the outputs of the first single-shot 4 and the fourth NAND gate 18.

The output signal from the first AND gate 22 is, also, applied through a second logical inverter 38 to the clock input of a third D flip-flop 40 and to the input of a sixth NAND gate 4. The Q output of the third D flip-flop 40 is connected to the clock input of a fourth D flip-flop 44. The $\overline{Q}$ outputs of the third and fourth D flip-flops 40 and 44 are connected to the respective D inputs thereof and to the respective input of a seventh NAND gate 46. The output of the seventh NAND gate 46 is connected to the input of a seventh single-shot 48 and to the D input of a fifth D flip-flop 50. The clock input of the fifth D flip-flop 50 is connected to the output of the logical inverter 38 while the Q output is connected to the sixth AND gate 42 to apply a second input signal thereto. The Q̄ output of the seventh single-shot 52 which, in turn, has its Q̄ output connected to the input of a ninth single-shot 54. The Q outputs of the single-shot 48, 52 and 54 are connected to respective inputs of a plurality of AND gates 56, 58, 60. A second input for each of the AND gates 56, 58 and 60 is obtained from the output of the sixth AND gate 42. The output signals from the AND gates 56, 58 and 60 are applied to respective NOR gates 62, 64 and 66 for transmission to respective D inputs of a plurality of latch, or storage, D flip-flops 68, 70 and 72. A plurality of NOR gates 74, 76, 78 and 80 are connected in a feedback relationship from the Q outputs to the clock inputs of the D flip-flops 68, 70 and 72 to control the setting of the D flip-flops 68, 70 and 72 by the single-shots 48, 52 and 54, as described hereinafter. The Q outputs of the D flip-flops 68, 70 and 72 are also connected to apply second input signals to respective ones of the three input NAND gates 6, 8 and 10.

MODE OF OPERATION

Referring to the waveshape diagram shown in FIGS. 2 to 5, there is shown in FIG. 2 an illustration of the overall operation of the clock signal extraction circuit of the present invention. As may be seen in FIG. 2, the reproduced, or playback, signal includes data and clock transitions. The locally generated fixed frequency blanking pulse is used in the clock extraction circuit to blank, or mask, the undesired data signal transitions during the clock signal extraction operation. For example, several undesired transitions are shown in a dotted line representation in FIG. 2. Since these data transitions occur between blanking pulses, they are rejected by the clock signal extraction circuit of the present invention and are indicated as "blank pulses" in the extracted clock waveshape.

FIG. 3 shows an enlarged waveshape representation of such a normal signal extraction operation. The safety zone is indicated at the time between the "accept" and "reject" operation during a cycle of the playback signal. The "blank period" is the fixed, or predetermined, time between the "on" time of the blanking pulses during which fixed time the transitions in the playback signal are rejected, or blanked, by the clock extraction circuit. In general, the clock signal extraction circuit shown in FIG. 1 selectively varies the clock signal extraction time, or the safety zone, of the clock signal extraction circuit, i.e., more than one value of the blanking period is available and is selectively used as the basis for extracting the recorded clock signals. If the reproduced signal pulse immediately preceeding the one currently being monitored by the clock extraction circuit had a time period which is very close to the beginning, or minimum, limit of the standard safety zone value, the "blank period" should be changed to a smaller duration value. Conversely, if the immediately preceeding reproduced signal pulse had a time period which was closer to the end, or maximum, of the standard safety zone value, the "blank period" should be changed to a larger value to prevent errors from occurring in the extracted clock signal. Since the rate of change of the immediately preceeding pulse time as a result of so-called "flutter" of the tape drive system, will be much slower than the frequency of the clock signal, the "safety zone" can be adjusted to more nearly match the instantaneous tape speed for any given time period. The "safety zone" can, thus, be selectively switched to a more favorable position as the relatively slow flutter induced speed variations oscillate around the nominal value of tape speed. The "safety zone" can be essentially doubled by using three "safety zones" which are selectively used by the exemplary clock extraction circuit shown in FIG. 1.

As shown in the block diagram of the exemplary embodiment of the invention illustrated in FIG. 1, the input single-shot circuit 4 produces short output pulse in response to each reproduced signal applied to the input terminal 2 which output pulse is steered by the input NAND gates 6, 8, and 10 to one of the three "zone" single-shots 12, 14 and 16. These "zone" single-shots 12, 14 and 16 may provide, for example, respectively, a 2.79 microsecond output pulse, a 3.75 microsecond output pulse and a 5.25 microsecond output pulse. Each of these three "zone periods" represents a different "safety zone" by providing a different blanking pulse width. Thus, as previously described, each of these "zone periods" is designed to mask the unwanted data transitions in order to extract the true recorded clock signal transition during a corresponding speed of the recording medium. The output signal from each of the "zone" single-shots 12, 14 and 16 is summed by the third NAND gate 18 and applied through a logical inverter 20 to the first AND gate 22. A second input signal to the AND gate 22 is obtained directly from the output of the input single-shot 4. Thus, the output signal from the AND gate 22 is produced only when the output signal from the input single-shot 4 is applied to the AND gate 22 in combination with the blanking pulse from one of the "zone" period single-shots 12, 14 and 16. The output signal from the AND gate 22 is applied an an energizing signal to the input of a sixth single-shot 26 to produce a fixed duration clock output signal, e.g., 1.75 microseconds, on the "clock out" terminal 28 from the sixth single-shot 26.

The output signal from the input single-shot 4 is also applied to the input of sixth NAND gate 36 along with the output of the fourth NAND gate 18, which is the summed output of the "zone" single-shots 12, 14 and 16. The output signal from the sixth NAND gate 36 is applied to the D input of a first D flip-flop 30. However, this input signal to the D flip-flop 30 is ineffective to change the state thereof until an input signal is applied to the clock input thereof. The input signal for the clock input of the D flip-flop 30 is obtained from the Q̄ output of the fifth single-shot 24 which is energized by the same output signal from the AND gate 22 that was used to actuate the sixth single-shot 26. The output signal from the fifth single-shot 24 is applied to the clock input of the D flip-flop 30 whenever an input signal transition occurs during a selected "zone" period to produce Q output from the D flip-flop 30 for application to the D input of the second D flip-flop 32. A clock input for the second D flip-flop 32 is also obtained from the output of the AND gate 22. The concurrent occurrence of the clock input and the D input to the second D flip-flop 32 produces a change of state thereof. This change of state is applied from the Q output of the second D flip-flop 32 to the "date out" terminal 32 as a representation of the data signal transition in the playback signal.

The output signal from the AND gate 22 is also applied through a logical inverter 38 to a clock input of third D flip-flop 40. The Q̄ output of the third D flip-flop 40 is connected to D input thereof to produce a change of state of the third flip-flop 40 for each clock input signal. Similarly, the fourth D flip-flop 44 is arranged to produce a change of its state for each clock input signal supplied from the Q output of the third flip-flop 40. The $\overline{Q}$ outputs of the third and fourth flip-flops 40 and 44 are summed by a sixth NAND gate 46. Since the flip-flops 40 and 44 will be in similar states for a short period of time with intermediate dissimilar states, the NAND gate 46 produces a periodic short duration high level output signal which is applied to the input of a sixth single-shot 48.

Concurrently, the outputs of the inverter 38 and the NAND gate 46 are applied to the clock and D inputs of a sixth D flip-flop 50 to produce a change of state of the flip-flop 50 for each clock pulse transition applied to the clock out singleshot 26 during the high level output from the NAND gate 46. The Q output from the sixth D flip-flop 50 is summed with the output of the first AND gate 22 by a second AND gate 42 to produce an output signal representative of the occurrence of a clock signal transition synchronized with the occurrence of an energizing signal applied to the sequence of single-shots 48, 52 and 54 used to produce a sequence of output signals having durations related to the three different "safety zones." The Q outputs of the single-shots 48, 52 and 54 are applied to respective inputs of the AND gates 56, 58 and 60 where each single-shot output signal is correlated, or compared, with the output signal of the AND gate 42. Thus, the AND gates 56, 58 and 60 compare the reconstituted clock pulses from the AND gate 22 with the nominal value represented by the duration of the pulse outputs of the single-shots 48, 52 and 54. The output signals from the AND gates 56, 58 and 60 change the state of one of the storage latches, or D flip-flops, 68, 70 and 72, if necessary, as the actual extracted clock occurrence changes with respect to the sequential energization of the single-shots 48, 52 and 54 due to changes in the speed of the recording medium. The NOR gates 62, 64, 66, 74, 76, 78 and 80 insure that only one of the storage latches 68, 70 and 72 is set a time. The Q output of the "set" latch of the latches 68, 70 and 72 is applied to a respective one of the input NAND gates 6, 8 and 10 to steer the next output pulse from the input single-shot 4 to the proper zone single-shots 12, 14 and 16.

For example, assuming a nominal 200 KHz input signal is applied at the input terminal 2, input pulses are generated every five microseconds at the output of the input single-shot for each clock pulse transition and every 2.5 microseconds for a data signal transition. Also, assuming that the previous input signal pulse spacing was nearly the nominal value so that the zone two single-shot 14 is enabled, the blanking pulse generated by the zone two single-shot 14 would be 3.75 microseconds long. This blanking pulse should mask or blank any data transition which occurs nominally 2.5 microseconds later. The five microsecond pulse from the input single-shot 4 ultimately triggers the first detector single-shot 48 which produces a 4.37 microsecond duration output signal. A second detector single-shot 52 is subsequentially triggered by the $\overline{Q}$ output signal from the first detector single-shot 48 and is still producing an output signal when the next input clock pulse transition occurs after a delay of 5 microseconds. The first detector single-shot 48 has completed its output signal at this time while the second detector single-shot 52 is still producing its output signal, e.g., a 1.87 microsecond duration signal. This Q output signal from the second detector single-shot 52 is gated through gates 58 and 64 to preset the second latch 70 which had also been similarly preset for the preceeding input signal cycle insuring that the next input pulse will also be steered through the second input NAND gate 8 to the zone two single-shot 14.

If the record tape speeds up momentarily, the higher tape speed will decrease the pulse spacing as shown in FIG. 4. As a result, the zone two single-shot 12 will be enabled by virtue of the fact that the first detector single-shot 48 will be still producing an output signal during the succeeding clock pulse which has now occurred less than 4.37 microseconds after its predecessor, Thus, the Q output from the first detector single-shot 48 will be applied through the gates 56 and 62 to set the first latch 68 whereby to energize the first input NAND gate 6. The blanking pulse period will then be switched from the previous 3.75 microsecond duration to a 2.79 microsecond duration signal from the zone one single-shot 6 which will be suitable to mask the undesired information pulse transitions during the higher tape speed. Conversely, if the tape slows down, the pulse spacing increases as shown in FIG. 5. This operating state will enable the zone three single-shot 16 if the clock pulse spacing exceeds 6.24 microseconds (4.37 + 1.87) instead of the nominal five microseconds. In other words, the next clock pulse will occur when the third detector single-shot 54 is enabled by the output of the second detector single-shot 52. The output signal from the third latch 72 through gates 60 and 66. The setting of the third latch 72, in turn, steers the next input pulse through the third input NAND gate 10 to the third zone single-shot 16. The blanking pulse is, then, switched to a 5.25 microsecond duration to assure a blanking of the data transition during the slow tape speed operation. The zone three single-shot 10 will continue to be enabled for succeeding clock pulses until the clock pulses decrease their occurrence time to less than 6.24 microseconds. As previously described, these changes of the clock pulse spacing occur more slowly then the time period of each individual clock pulse so that a safety zone will normally be used for a large number of clock pulses before being changed to a new value as described above. As may be seen from the foregoing description, the "safety zone" can, thus, be more than doubled by using the technique of the present invention to extract the clock signal from the recorded self-clocking digital code.

Accordingly, it may be seen that there has been provided, in accordance with the present invention, an improved clock signal extraction circuit for extracting a clock signal from a recorded self-clocking digital code.

The embodiments of the invention in which an exclusive property or privilege is claimed are defined as follows:

1. A signal gating circuit comprising:
   a first signal gating means having a first and a second input circuit and an output circuit,
   a first plurality of signal generating means arranged to generate a plurality of differing duration output signals,
   a second signal gating means having a plurality of signal gating circuits equal in number to said plurality of signal generating means with each of said signal gating circuits having a first and a second input and an output circuit connected to a one of said signal generating means,
   an input terminal, first circuit means connecting said input terminal to said first input of each of said signal gating circuits, second circuit means connecting said input terminal to said second input circuit of said first signal gating means, output terminal means, third circuit means connecting said output circuit of said first signal gating means to said output terminal, fourth circuit means connecting an output of each of said signal generating means to said first input of said first signal gating means, a second plurality of signal generating means arranged to generate a sequence of differing time period output signals in response to an input control signal applied thereto, fifth circuit means arranged to apply an output signal from said output circuit of said first signal gating means as a control signal to said second plurality of signal generating means, comparator means connected to said output circuit of said first signal gating means and to said second plurality of signal generating means for comparing the time of occurrence of an output signal from said output circuit of said first signal gating means with each of said differing time period signals from said second plurality of signal generating means and for producing an output signal representative of a match between said output signal from said output circuit of first signal gating means and said differing time period signals, and third signal gating means arranged to apply said output signal from said comparator means to said second input of a selected one of said second signal gating means as determined by the match between the signals compared by said comparator means to control an output signal from a respective one of said first plurality of signal generating means for application to said first input of said first signal gating means.

2. A signal gating circuit as set forth in claim 1 wherein said comparator means sequentially compares said output signal from said output circuit of said first signal gating means with each of said differing time period signals in a predetermined order.

3. A signal gating circuit as set forth in claim 1 wherein said first plurality of signal generating means each includes a monostable multivibrator for producing a predetermined duration output signal.

4. A signal gating circuit as set forth in claim 1 wherein said second plurality of signal generating means includes a plurality of monostable multivibrators arranged to produce said plurality of differing time period signals.

5. A signal gating circuit as set forth in claim 4 wherein said first plurality of signal generating means is equal in number to the number of said monostable multivibrators in said second plurality of signal generating means.

6. A signal gating circuit as set forth in claim 5 wherein said comparator means includes a plurality of AND gate means with each of said AND gate means being arranged to sum said output signals from said first signal gating means with an output signal from a respective one of said monostable multivibrators in said second plurality of signal generating means.

7. A single gating circuit as set forth in claim 6 wherein said third signal gating means includes a plurality of signal storage means with each of said signal storage means having an output connected to an input of a corresponding one of said AND gate means.

8. A signal gating circuit as set forth in claim 7 wherein each of said signal storage means has an output connected to said second input of a corresponding one of said signal gating circuits in said second gating means.

9. A signal gating circuit as set forth in claim 7 wherein each of said signal storage means is a flip-flop.

10. A method of gating a signal including the steps of comparing the time of occurrence of the signal with each of a plurality of differing period signals, producing an output signal corresponding to a match between the compared signals, applying the output signal to a respective one of a plurality of signal generating means to produce a corresponding duration output signal and applying the signal to be gated and said lastmentioned output signal to a gate circuit to control the gating of the signal to be gated through said gate circuit.

* * * * *